E. H. CARROLL.
BEARING FOR SHAFTING.
APPLICATION FILED NOV. 29, 1912.
1,181,991.
Patented May 9, 1916.
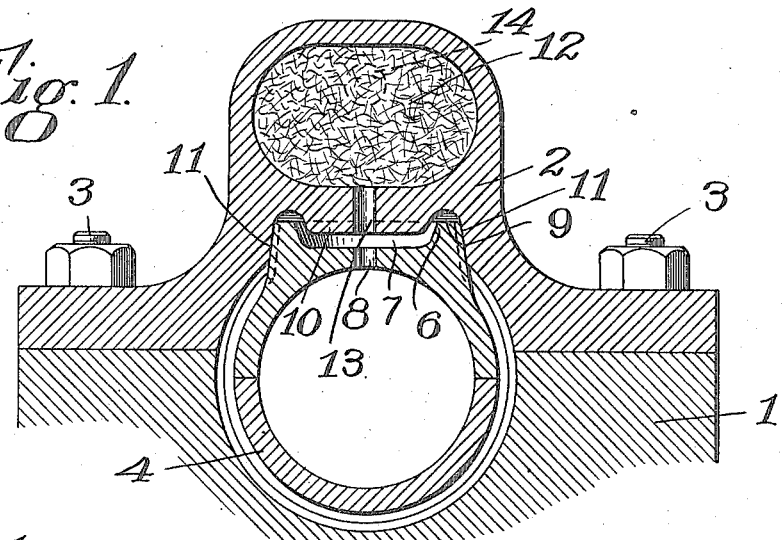
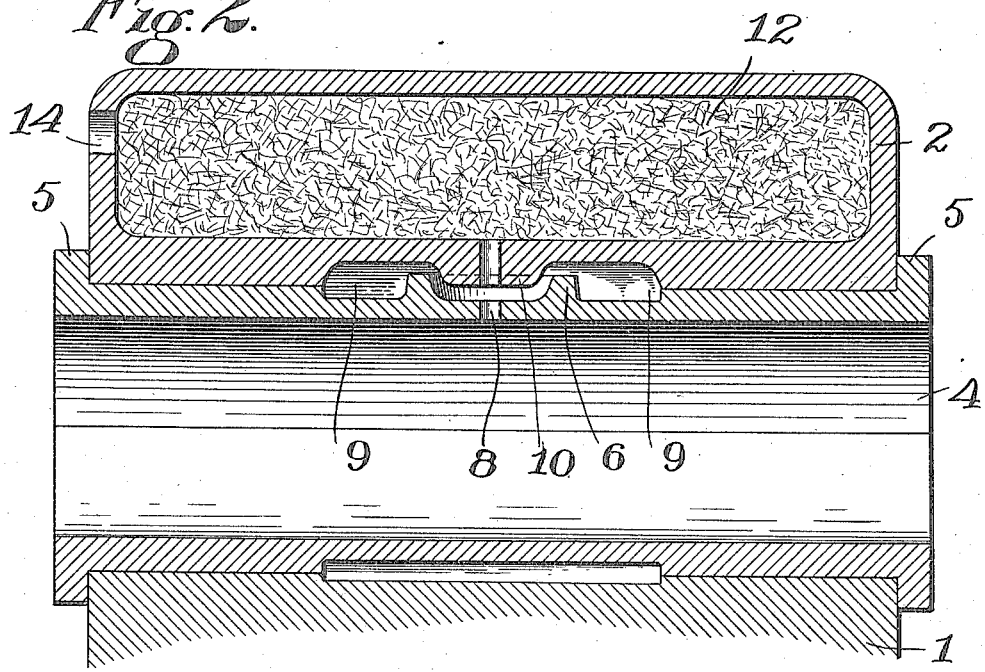
Witnesses.
R. D. Tolman.
Penelope Comberbach.
Inventor
Elbert H. Carroll.
By Ralph E. Atherton.
Attorney

UNITED STATES PATENT OFFICE.

ELBERT H. CARROLL, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

BEARING FOR SHAFTING.

1,181,991.      Specification of Letters Patent.      Patented May 9, 1916.

Application filed November 29, 1912. Serial No. 734,078.

*To all whom it may concern:*

Be it known that I, ELBERT H. CARROLL, a citizen of the United States, residing at Worcester, in the county of Worcester and Commonwealth of Massachusetts, have invented a new and useful Improvement in Bearings for Shafting, of which the following, together with the accompanying drawing, is a specification.

My invention relates to bearings and particularly to that class of bearings suitable for supporting lines of shafting for driving machinery, although it is clearly applicable in various instances where it may be desired to support other kinds of rotatable elements.

In order that the friction in a bearing may not be too great, it is frequently desirable, or even necessary, to provide the main portion of the bearing or the box with a bushing of bronze, or some other suitable material, in which the shafting or the like may turn. In order to be properly supported, this bushing should fit fairly well the hole or opening in the box provided for it and, at the same time, the bushing should not turn with the shafting or it could not perform its function. A cylindrical bushing is the easiest to produce for the reason that the opening in the box may be formed by a simple boring operation and the bushing may be fitted to the opening in the box by turning it down in a lathe.

One of the objects of my invention is to provide a bearing including a cylindrical bushing which may be fitted to the opening in the box in the simple manner just indicated, the construction being such, however, that the bushing cannot turn with the shafting.

A further object of the invention is to provide such a construction that the rotatable elements will be efficiently lubricated and all access of dust and other foreign matter to the rotatable elements prevented.

Still further objects and advantages will appear from the following description taken in connection with the accompanying drawing showing one embodiment of the invention, and in which—

Figure 1 is a central vertical cross sectional view of a bearing constructed in accordance with my invention, and Fig. 2 is a central vertical longitudinal sectional view of the same form of bearing.

Similar reference characters indicate like parts in both figures.

The main or body portion 1 of the bearing may be supported in any suitable manner. It has a cap 2 secured to its upper face by bolts 3. Between the body portion 1 and the cap 2 is a cylindrical bore in which fits the bushing 4, the body portion 1 and cap 2 forming a support or box for the bushing. The bushing is divided into an upper part and a lower part to allow a rotatable element to be easily placed therein, and is also provided with a shoulder 5 at each end to prevent longitudinal displacement thereof in its support. The inside of the bushing 4 is finished to provide a proper bearing surface for the rotatable element which it is to support. The central portion of the bushing 4 is contracted in diameter and the corresponding portion of the opening in the box is enlarged, as shown, to provide clearance space around this central portion of the bushing. The two end portions of the bushing are turned to fit snugly in the corresponding portions of the box.

The bushing 4 is formed with a rim 6 on top of its contracted section, this rim forming a shallow oil cup, the space 7 within the rim being connected with the interior of the bushing by a small oil hole 8. A suitable recess 9 is provided in the lower face of the cap 2 to receive the rim or oil cup 6, this recess 9 being sufficiently large to provide a considerable clearance above and at the sides of the oil cup. Depending from the lower face of the cap 2 and into the shallow space 7 within the oil cup 6 is a short projection 10. This projection extends part way into the space 7, but is smaller in diameter, so that a little clearance is left between the projection and cup. The recess 9 is sufficiently large to provide considerable clearance above and on all sides of the rim or oil cup 6, except at opposite ends 11 of that diameter of the cup which is transverse to the axis of the bearing. At these two points, the outer diameter of the cup is enlarged slightly to contact with the adjacent portions of the wall of the recess 9. Clearance is preferably left at all other points, however, between the central or contracted portion of the bushing and the box. This construction is an important feature of the invention. As the shaft or other rotatable element turns in the bushing, it will have a tendency to cause the bushing to turn with it. This would be objectionable as the oil hole 8 would not always be in proper position to perform its function and, furthermore, the bushing is designed for the rotatable element to turn therein and not to turn in the box.

It is obvious that in my bearing the bushing 4 is prevented from turning by the firm and positive engagement of the rim or oil cup 6 by the sides of the recess 9 in the cap 2. And with the exception, if necessary, of fitting the sides of the rim 6 at the points 11 to the space provided by the recess 9, the bushing may be fitted to the box entirely by turning in a lathe, the projecting rim 6 not being in a position to interfere with the turning tool.

The upper portion of the cap 2 is hollow and contains wool waste or other absorbent material 12 to hold a supply of oil for the bearing, this portion of the cap thus constituting an oil reservoir. This oil reservoir is connected with the oil cup 6 by an oil hole 13 through which oil passes slowly from the felt to lubricate the bearing. A hole 14 is provided in one end of the cap to permit oil to be introduced from an oil can. The only possible chance for anything to reach the oil cup 6 and the bearing is by way of the hole 14. The oil, of course, can soak through the wool waste and so reach and lubricate the bearing, but the wool waste will effectively hold back all dust and other foreign matter.

By extending the projection 10 surrounding the oil hole 13 down into the oil cup 6, it is clear that oil descending through the oil hole 13 will not spread along the surface of the recess 9 and down between the lower part of the bushing and the box, but will drop from the lower end of the projection 10 into the cup 6 and from there through the oil hole 8 to lubricate the inner surface of the bushing.

I do not wish to be limited to the details of construction shown and described, as certain changes may be made within the scope of the appended claims without departing from the invention; but Having described one embodiment of the invention, what I claim as new and desire to secure by Letters Patent is:

1. A bearing including a support providing a cylindrical bore, a cylindrical bushing disposed in said bore, said bushing having a projection thereon disposed within a recess of said bore and in contact with the sides of said bore at points in a line transverse to the axis, whereby the bushing is prevented from turning in said bore, the bushing being reduced in diameter on each side of said projection, to permit of its being turned in a lathe, and the bore of the support being enlarged in diameter for a length corresponding to the reduced section of the bushing, to permit of said bore being formed by a boring operation, the reduced and enlarged sections of the bushing and bore respectively coöperating to form an annular space receiving the projection of the bushing.

2. A bearing including a support providing a cylindrical bore, a cylindrical bushing disposed in said bore, a portion of the wall of the bore being recessed to provide a space between the same and said bushing, a projection on the bushing disposed within said space, and providing an oil cup having an opening leading to the interior of the bushing, the wall of said space having a projection extending within and below the rim of said oil cup and providing an oil hole leading into said cup.

Dated this 22nd day of November, 1912.

ELBERT H. CARROLL.

Witnesses:
  PENELOPE COMBERBACH,
  NELLIE WHALEN.

Copies of this patent may be obtained for five cents each, by addressing the "Commissioner of Patents, Washington, D. C."